No. 885,056. PATENTED APR. 21, 1908.
W. KIESER.
MEANS FOR COLLECTING LUBRICATING OIL FROM SHIP TURBINE SHAFT BEARINGS.
APPLICATION FILED MAY 11, 1907.

Witnesses:
Lloyd C. Bush
J. Ellis Glen.

Inventor:
Walter Kieser,
By Alnde Davis
Atty

UNITED STATES PATENT OFFICE.

WALTER KIESER, OF BERLIN, GERMANY, ASSIGNOR TO GENERAL ELECTRIC COMPANY, A CORPORATION OF NEW YORK.

MEANS FOR COLLECTING LUBRICATING-OIL FROM SHIP-TURBINE SHAFT-BEARINGS.

No. 885,056.   Specification of Letters Patent.   Patented April 21, 1908.

Application filed May 11, 1907. Serial No. 373,050.

*To all whom it may concern:*

Be it known that I, WALTER KIESER, a citizen of Switzerland, residing at Berlin, Germany, have invented certain new and useful Improvements in Means for Collecting Lubricating-Oil from Ship-Turbine Shaft-Bearings, of which the following is a specification.

My invention has reference to improvements in apparatus for collecting the excess of lubricating oil which continuously flows from the bearings of ship turbine shafts to which the oil is fed under pressure and from which it flows spontaneously without pressure. This excess of lubricating oil is usually carried off by pipes to one or more collector vessels from which it is again pumped back to the bearings. The turbine shafts, however, are necessarily located as near as possible to the bottom of the ship, so that the collector vessel or vessels cannot be placed at a much lower level than the bearings, and the consequence is that when the ship pitches to a considerable extent it happens that some of the bearings are for an appreciable time below the level of the oil in the collecting vessel or vessels, so that the oil cannot spontaneously flow from the bearings into the collector vessels, but flows off in any direction and is thus lost. In stormy weather the waste of lubricating oil thus becomes very serious, and if the oil in the collector vessels is not replenished in time the bearings may run dry and become dangerously hot. This difficulty might be overcome by placing under each bearing a separate oil collecting vessel and providing a special independent pump for each vessel, but the installation and maintenance of many pumps is both troublesome and expensive, and my invention accomplishes the same result in a cheaper and more convenient manner.

In accordance with my invention, a special oil pot or collecting vessel is arranged under each bearing and all the pots are connected to a common return pipe from which the oil is pumped back to the bearings; but the connection of each pot with the common pipe is controlled by a valve which, in turn, is controlled by a float which is partly or wholly immersed in the oil in the pot and is so adjusted that it closes the exit valve when the oil level has dropped to a certain point.

In the accompanying drawing one of the embodiments of the invention is illustrated as follows:—

Figure 1:
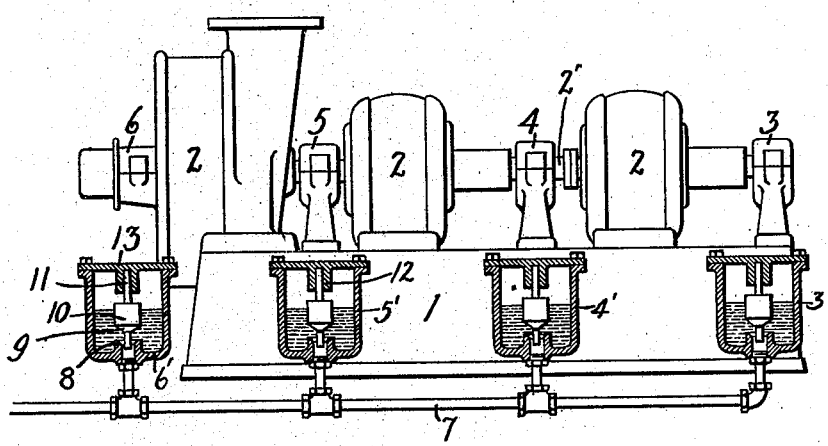
Figure 2:
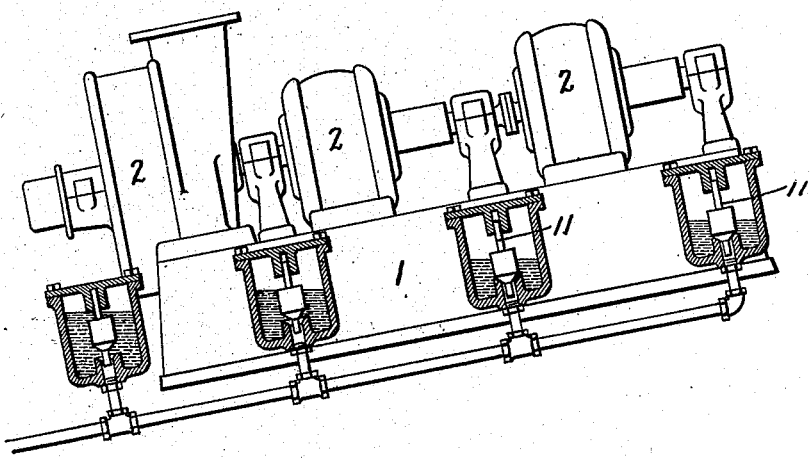

Figure 1 is an elevation of the arrangement of the apparatus when the ship is on level keel, but showing the oil collectors in vertical section, and Fig. 2 is a like view of the apparatus when the ship's keel is inclined to the horizon.

Like numerals of reference indicate like parts.

Upon the base 1 are mounted the turbine elements 2, 2, 2, and their common shaft 2' runs in the bearings 3, 4, 5, 6. Under each bearing is arranged an oil pot or collector vessel 3', 4', 5', 6', each receiving the overflow oil from the bearing above it by spontaneous flow in the usual manner and all are connected at their bottoms with the common return pipe 7 by short sections of pipes and couplings, as indicated. Each oil pot has a valve seat 8 immediately above the point where the pot is connected with the common return pipe, and the valve 9, adapted to close the valve seat, is surmounted by a float 10. The upwardly extending valve stem 11 is guided in the bore of a boss 12, which depends from the cover 13 of the pot.

The common return pipe 7 is connected with an oil pump by which the oil is drawn from the pipe and from those pots in which the valves are open, and is again forced through the bearings. This pump and its delivery to the bearings is not shown in the drawings, since it forms no part of my invention and is old in the art.

When the ship runs on an even keel the turbine shaft is substantially in a horizontal position, as indicated in Fig. 1, and in that case, the accumulated oil in the different pots has substantially the same depth and completely immerses each float to the same depth; consequently, all valves are raised from their seats and the oil may be withdrawn from the same uniformly and as quickly as it accumulates. But when the ship pitches and the turbine shaft becomes inclined to the horizon, as indicated in Fig. 2, the depth of oil in the different pots will be different, and when in any pot, as for instance in pot 3', the oil level sinks below the total height of the valve and float, the valve will completely close the communication of the pot with the return pipe, thus preventing a further drop of the oil level in the particular pot or the emptying of the pot and the entrance of air into the return pipe. In those pots in which the oil level is high enough to completely submerge the float-valves, the valves will be raised and the oil can be withdrawn from the same by the normal action of the pump, thus preventing an overflow.

What I claim as new and desire to secure by Letters Patent of the United States, is,—

1. In a system of collection of overflow lubricating oil from the bearings of ship turbines, the combination of such bearings with a series of oil collecting pots, one under each bearing and each connected to a common return pipe, substantially as described.

2. In a system of collection of overflow lubricating oil from the bearings of ship turbines, the combination of such bearings with a series of oil collecting vessels, one under each bearing and each connected with a common return pipe, and a float valve for each vessel controlling the communication thereof with the return pipe, substantially as described.

3. The combination of lubricated bearings of the common driving shaft of a ship turbine system, with a series of oil collecting pots, one for each bearing, and all at the same distance below the shaft, a common oil return pipe tapping the bottom of each oil pot, and a float valve in each pot controlling the communication thereof with the common oil return pipe, substantially as described.

In witness whereof, I have hereunto set my hand this 16th day of April, 1907.

WALTER KIESER.

Witnesses:
 FRIEDRICH RANZER,
 LUDWIG CUBELIC.